United States Patent [19]

Biverot

[11] Patent Number: 5,327,153
[45] Date of Patent: Jul. 5, 1994

[54] DISPLAY ARRANGEMENT

[75] Inventor: Hans Biverot, Vällingby, Sweden

[73] Assignee: Nobeltech Electronics AB, Jarfalla, Sweden

[21] Appl. No.: 897,471

[22] Filed: Jun. 12, 1992

[30] Foreign Application Priority Data

Jun. 12, 1991 [SE] Sweden .................. 9101778-0

[51] Int. Cl.⁵ .............................................. H04M 3/10
[52] U.S. Cl. ......................................... 345/5; 345/8; 345/32; 380/54
[58] Field of Search .......................... 358/88, 142, 92; 340/705; 380/54; 345/5, 32, 8; H04N 7/18, 3/10

[56] References Cited

U.S. PATENT DOCUMENTS

| | | | |
|---|---|---|---|
| 2,832,821 | 4/1958 | Du Mont | 358/142 |
| 2,914,603 | 11/1959 | Gabriel | 380/54 |
| 3,860,741 | 1/1975 | Adler et al. | |
| 4,424,529 | 1/1984 | Roese et al. | 358/92 |
| 4,967,268 | 10/1990 | Lipton | 358/92 |
| 5,233,436 | 8/1993 | Oksman | 380/54 |

FOREIGN PATENT DOCUMENTS 0344882  6/1989  European Pat. Off. .
0473343  4/1992  European Pat. Off. .
2115179  9/1983  United Kingdom .

*Primary Examiner*—Howard W. Britton
*Attorney, Agent, or Firm*—Pollock, Vande Sande & Priddy

[57] ABSTRACT

A display arrangement for displaying an image for a viewer on the basis of at least two variables for each picture element such as a picture element position and picture element information includes a first and a separate second display element arranged at a distance from one another in the optical viewing range of the viewer and an element for mutual synchronization therebetween with each display element of the display arrangement reproducing at least one variable. The first and second display elements are arranged along a line creating a viewing direction for the viewer, which essentially coincides with the direction from the viewer to the first display element and the second display element is arranged in the immediate vicinity of the viewer and is carried by the viewer to follow his movements whereby viewing is invariant in space.

12 Claims, 2 Drawing Sheets

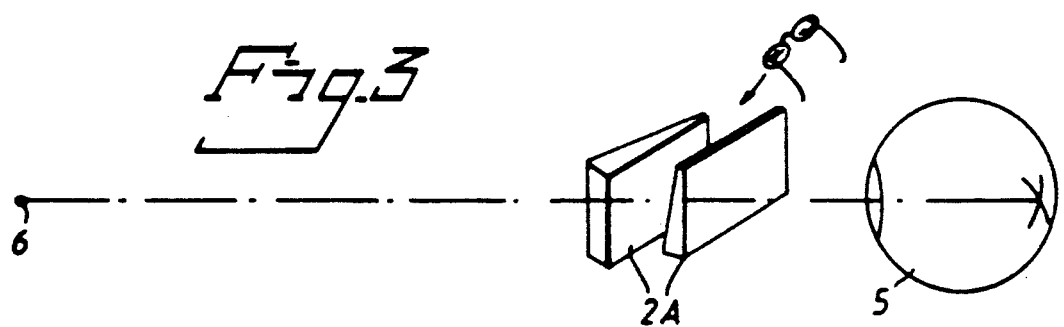
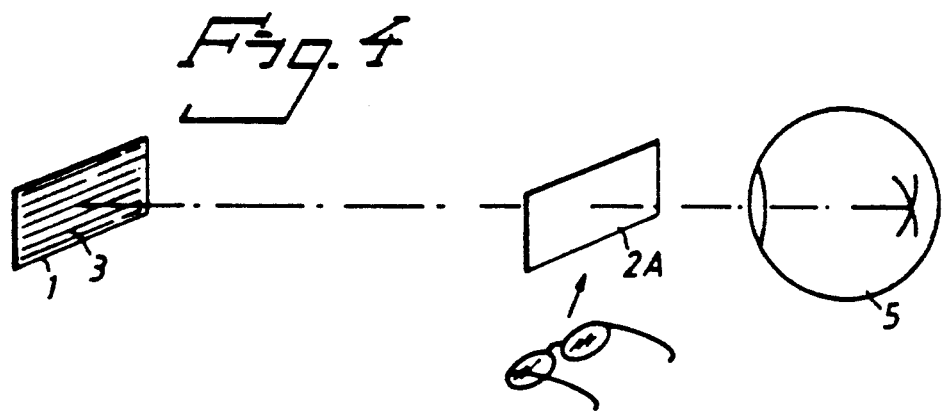
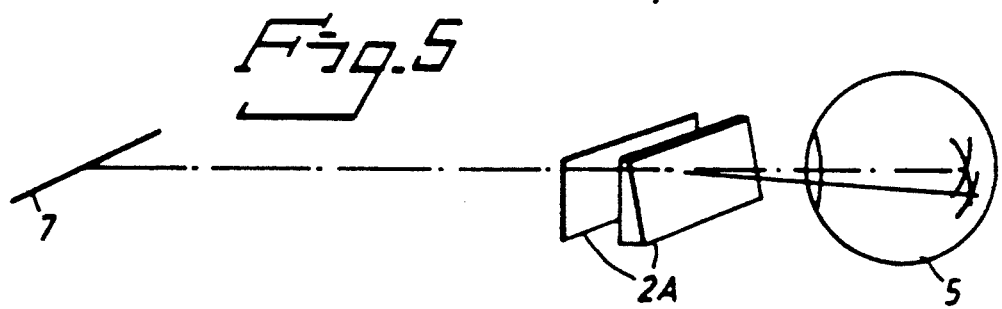
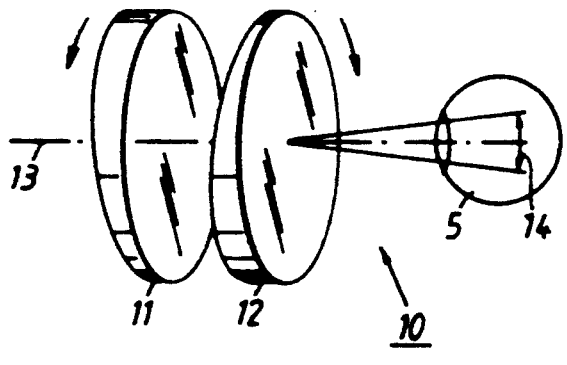
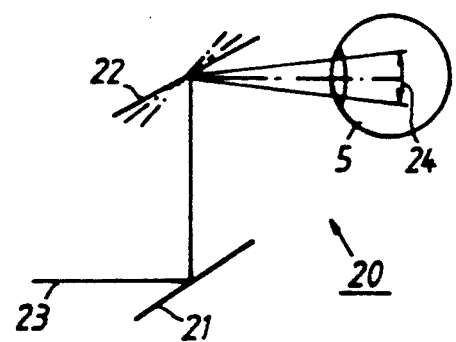

DISPLAY ARRANGEMENT

FIELD OF THE INVENTION

The present invention relates to a display arrangement for displaying an image for a viewer on the basis of at least two variables for each picture element such as picture element position and picture element information.

BACKGROUND OF THE INVENTION

An image is viewed in connection with above display arrangements as being built up of a number of least resolution elements for the viewer, called picture elements. The image can be considered to consist of a distribution of these picture elements in two dimensions. Thus, the image can be viewed as a number of picture elements which are in each case defined by a picture element position given by two angle coordinates $V_1$ and $V_2$ relative to a reference direction from the viewer, and information in the form of intensity, color, polarization and so forth at each point in time, belonging to each picture element.

A system in which all picture elements synchronously emit picture information within a time interval which is shorter than the integration time $\tau$ of the human eye is perceived as a non-flickering image by the viewer. Such an image can be static, for example a photograph, or sequentially generated within the time $\tau$ by one or several picture elements emitting at the same time at a suitably high repetition rate, for example TV, to be perceived as a complete image by the eye.

Examples of such display arrangements already known are monitors, TV sets and PPI screens. It is common to all these display arrangements that all the image information items, that is to say two angle distributions and picture element information items, which can subsequently contain information on intensity distribution, color, polarization and so forth, are generated in a display element arranged at one and the same place. The viewer is located at a distance from the display element which, depending on the type of display element, can vary between a distance of 0.5 meters and tens of meters and possibly even a greater distance.

In another type of display arrangement according to the first part, the display element is mounted in the immediate vicinity of the viewer. An example of the last-mentioned type of display arrangement is disclosed in SE B 8403706-8. In this case, the display element is mounted on a helmet carried by the viewer. The image is introduced into the view of the viewer with the aid of a semi-reflecting screen. In this case, too, all the picture information items are generated in a display element arranged at one and the same place.

SUMMARY OF THE INVENTION

According to the present, the display element is divided into two display elements arranged at a distance from one another. Due to the fact that the complete image is not produced at one and the same place, it is made more difficult for an unauthorized viewer, who only has access to a first display element which is distal with respect to the viewer, to perceive any useful picture information. Dividing the display element also provides a possibility for an individual final image to be presented to each viewer since the second display element, which is arranged in the immediate vicinity of the viewer, can be supplied with individual information. A further advantage of the present invention is that the first display element can be made very compact. The result is that more display arrangements than now can be squeezed into for example an operator work station. This compact design also opens up great possibilities for improving the work station for an operator or the like by being able to pay greater attention to ergonomic and health-related requirements.

According to the invention, the above advantages are achieved by a display arrangement according to the introduction to the description in which the display arrangement is divided into a first and a second display element arranged at a distance from one another and provided with means for mutual synchronization, each display element of the display arrangement representing at least one variable, and the second display element being arranged in the immediate vicinity of the viewer.

An image is suitably displayed on the basis of three variables, two of which relate to a picture element position for two angle distributions and a third one being associated with picture element information. In a preferred embodiment with the above three variables, the display arrangement is characterized by the fact that the first display element generates picture element information and one angle distribution, while the second display element generates the second angle distribution. Starting with, for example, a horizontal or vertical line presented by the first display element, the final image can be built up by the second display element by vertical or, respectively, horizontal angle modulation in front of the viewer's eye. In the case of vertical modulation, for example, several first display elements can be placed in a horizontal plane at almost right angles to the direction of viewing. The first display elements are apparently perceived as several display arrangements sticking up out of the horizontal plane on viewing at an oblique angle with respect to the desk. There is no actual hardware sticking up. A horizontal modulation provides possibilities for fascinating wide angle effects with high information content. Instead of a horizontal or vertical placement of the line, it can be inclined or horizontal in the depth direction.

Two viewers can perceive different images by individually adapting the variables supplied to the second display element. For example, sensitive information can be withheld from one viewer by this means. The display arrangement individually entails that only information of interest to the respective viewer is displayed and unessential information is suppressed. The embodiment is characterized by the fact that the second display element is supplied with variables which are individually adapted for producing an image individually adapted for the respective viewer. A viewer can also be supplied with a pair of stereo images for 3D display, that is to say one part image for each eye.

In the text following, the present invention will be described in greater detail in an exemplified form with reference to the attached drawings, in which:

BRIEF DESCRIPTION OF THE DRAWINGS

FIGS. 2-5 diagrammatically show four alternative embodiments of a display arrangement according to the invention for three variables; and FIGS. 6–7 show two different examples of angle modulators which can be used in a display arrangement according to the invention.

DETAILED DESCRIPTION OF THE PREFERRED EMBODIMENT(S)

Figure 1:
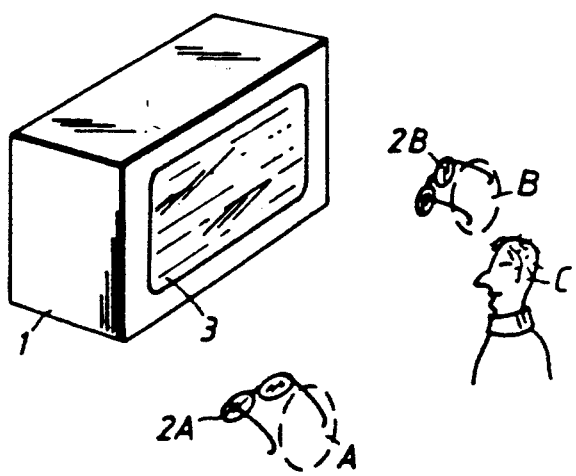
FIG. 1 diagrammatically illustrates the principle of a display arrangement according to the present invention.

FIG. 1 shows a display arrangement comprising a first display element 1 and two second display elements 2A, 2B. In front of the first display element 1 and at a distance from it are located three viewers or operators A, B, C, of whom A and B are only indicated by means of dashed rings. The viewers A and B are each provided with second display elements 2A, 2B. The second display elements are diagrammatically shown as glasses and an exemplified description of the function of the glasses will be given later. The third viewer lacks glasses, that is a second display element.

The image 3 which is shown on the first display element is incomplete. A viewer without the second display element such as viewer C does not perceive any significant content in the image 3. Viewers A and B, who are provided with the second display elements 2A, B, however, can perceive a meaningful picture information. The image 3 shown in the first display element 1 is completed with picture information supplied to the second display element in the vicinity of the respective viewers A, B.

The first and second display elements are synchronized with one another so that each picture element is perceived as standing still in the space of the viewer.

Synchronization can be effected by using the supply mains or a stable oscillator or by utilizing data in the video signal.

The second display elements 2A and 2B of viewers A and B need not be supplied with identical picture element information. It is quite possible to show a finished image to viewer A and a second finished image to viewer B. This provides the possibility for selective image display. The picture information essential to the respective viewer can be lifted out and any confidential information can be masked.

Dividing the image production into two separated display elements on the basis of three variables can be done in accordance with a number of different combinations. If $V_1$ designates a first variable for angle distribution, $V_2$ a second variable for angle distribution and $I(V_1, V_2)$ a third variable with respect to intensity/polarization and so forth, there are six combinations of picture elements P for distribution between a first and a second display element in such a manner that both display elements will produce at least one variable each. The combinations can be seen from the following table:

| Combination | First display element | | Second display element | |
|---|---|---|---|---|
| 1 | $IV_1$ | | | $V_2$ |
| 2 | I | $V_2$ | $V_1$ | |
| 3 | I | | $V_1$ | $V_2$ |
| 4 | $V_1$ | $V_2$ | I | |
| 5 | | $V_2$ | I | $V_1$ |
| 6 | $V_1$ | | I | $V_2$ |

Figure 2:
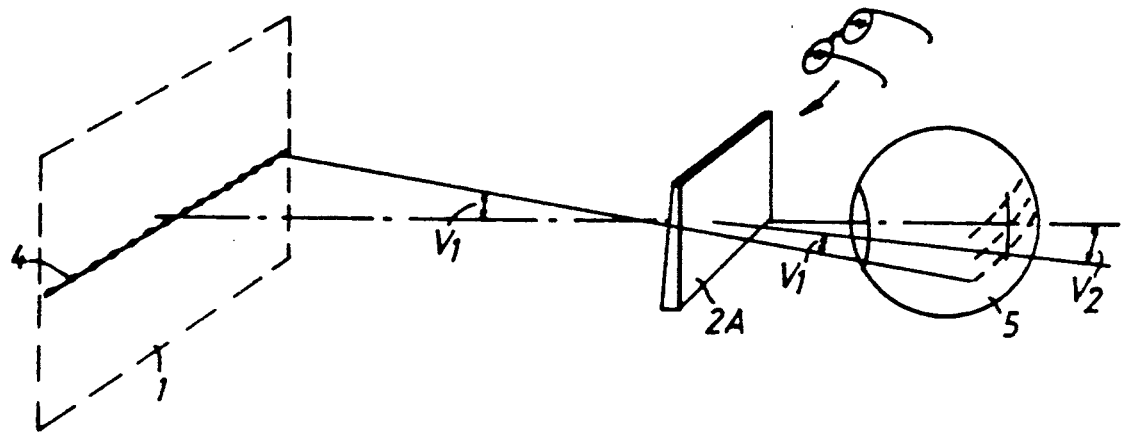

FIG. 2 shows an embodiment according to combination 1 or 2. An angle distribution of picture elements $V_1$ and picture element information $I(V_1, V_2)$ is supplied to the first display element for each value of $V_2$ while the second angle distribution $V_2$ (t) varies via the second display element. The first display element 1 shows a horizontal line 4 modulated with picture element information items. An eye 5 of a viewer A perceives a two-dimensional image by the influence of the second display element 2A which modulates or spreads out the line 4 at right angles to the direction of the line. In the embodiment, a horizontal line 4 is specified. There is nothing to prevent the line from being displayed vertically or in any other suitable direction. The modulation of the second display element provides a complete image.

The combinations 1 and 2 can be implemented as a luminous array with modulated elements which are deflected in front of the viewer's eyes with the aid of an angle modulator at right angles to the direction of the array, for example in the form of personal "display glasses".

One-dimensional deflection can be done optomechanically with, for example, rotating or vibrating mirrors, rotating wedges or the like. Electro-optical modulators are also possible. The deflection is assembled with a pair of glasses which deflect a certain part of the spectrum/field of view and so forth to the moving element.

A horizontal line 4 or bar which is vertically modulated in front of the eyes provides a "roller blind effect". The line or bar can be built into the keyboard unit or other neat designs. If several first display elements are placed in one horizontal plane, apparently several display arrangements are obtained without any hardware protruding in reality when viewing at oblique angles with respect to the horizontal plane.

By modulating a vertical line or bar in front of the eyes, a wide field of view can be swept, for example so-called "head-up displays". This makes it possible to produce an appreciable wide angle effect with a high information content.

The final images are "personal" and do not disturb and are not communicated to the environment. Overwriting of text, for example menus with outputs in a word processor, or images, drawings or images for example with CAD applications, are possible improvements with respect to effectiveness and ergonomics.

In vehicles, aeroplanes and so forth, where there is a scarcity of space, large gains can be achieved. 3-D effects can also be introduced with a double bar and polarization or color separation. For data terminals and work stations, large gains can be made in weight, volume and price, as well as advantages in the form of increased effectiveness, better ergonomics, high security, among others.

FIG. 3 shows an embodiment according to the combination 3 above. The first display element is supplied with picture element information $I(V_1, V_2)$. The first display element shows a modulated point 6. A viewer A perceives a two-dimensional image through the influence of the second display element 2A on the modulated point 6. A laser, not shown, can be used for producing the point 6. An angle modulator contained in the second display element must be fast and the deflection can be produced by electrooptical deflection in at least one direction. The display elements are synchronized in two dimensions. Combination 2 has the result that a point shown by the first display element can be seen with a selectable field of view over a wide range. In an alternative embodiment, point 6 can be replaced with a multi-channel matrix with picture element information supplied at the same time for a subset of the image.

FIG. 4 shows an embodiment according to combination 4. The two angle distributions are supplied to the first display element 1 while the picture element information is supplied to the second display element 2A. The first display element shows an uniformly illuminated image 3. The final image is completed by intensity modulation in connection with a viewer in the second display element 2A. Some conceivable applications can be a use in a vehicle or with large collections of displays in a control room where only one image is needed at a time or where several persons have limited space but a large requirement for information. The second display element contains an intensity modulator, preferably of the electrooptical type and is suitably installed in an element which, for example, can be attached in the immediate vicinity of the viewer in a similar way to glasses.

In combinations 5 and 6, which are reproduced in FIG. 5 by means of a horizontal evenly luminescent line 7 displayed by the first display element 1, the first display element is sequentially supplied with an angle distribution $V_1(t)$ or $V_2(t)$ of picture elements and the second display element is supplied with the other angle distribution $V_2(t)$ or, respectively, $V_1(t)$ and the picture element information $I(V_1, V_2)$, where t specifies a time variable. The first display element shows an evenly luminescent array and constitutes a one-dimensional variant of the evenly illuminated image in combination 4 described with reference to FIG. 4.

Apart from a purely x-y deflection, the control pattern for the angle vector with time can be executed in many other ways for the embodiment described and other conceivable embodiments.

FIG. 6 diagrammatically shows a first example of an angle modulator 10. The modulator contains two wedges 11, 12. A motor, not shown, rotates the wedges 11, 12 in opposite directions. An incident beam 13 is distributed by the rotating wedges along a line 14 in the eye of the viewer.

Another example of an angle modulator which can be used in a display arrangement according to the invention is shown in FIG. 7. The modulator 20 contains two mirrors 21, 22, the mirror 22 of which can be turned. An incident beam 23 is reflected by the built-in mirrors 21, 22 and is distributed along a line 24 in the eye 5 of the viewer by turning the mirror 22.

To produce a non-flickering image, all picture elements can be generated sequentially within an interval of the integration time of the eye. This can lead to technical problems which is why it may be necessary for practical reasons to generate several picture elements in parallel in time. The image can then be built up, for example, by a limited subset of picture elements $P_i$ in the form of line array or two-dimensional matrix which "paint" over the whole image by angle modulation. The principle distribution according to the above table applies to each picture element.

I claim:

1. Display arrangement for displaying an image for a viewer on the basis of at least two variables for each picture element such as a picture element position and picture element information, the display arrangement including:
    a first and a separate second display element arranged at a distance from one another in the optical viewing range of the viewer and means for mutual synchronization therebetween;
    each display element of the display arrangement reproducing at least one variable;
    the first and second display elements being arranged along a line creating a viewing direction for the viewer, which essentially coincides with the direction from the viewer to the first display element and the second display element being arranged in the immediate vicinity of the viewer and being carried by the viewer to follow the movements of the viewer whereby viewing is invariant in space.

2. Display arrangement according to claim 1, wherein each picture element in an image is being displayed on the basis of three variables, namely two angle distributions and a picture element information, and wherein the first display element generates picture element information and one angle distribution while the second display element generates the second angle distribution.

3. Display arrangement according to claim 1, wherein each picture element in an image is being displayed on the basis of three variables, namely two angle distributions and a picture element information, and wherein the first display element generates picture element information while the second display element generates the two angle distributions.

4. Display arrangement according to claim 1, wherein each picture element in an image is being displayed on the basis of three variables, namely two angle distributions and a picture element information, and wherein the first display element generates the two angle distributions while the second display element generates the picture element information.

5. Display arrangement according to claim 1, wherein each picture element in an image is being displayed on the basis of three variables, namely two angle distributions and a picture element information, and wherein the first display element generates one angle distribution while the second display element generates the other angle distribution and the picture element information.

6. Display arrangement according to claim 1, wherein the second display element is supplied with variables which are individually adapted for producing an individually adapted image for the respective viewer.

7. Display arrangement according to claim 1, wherein two part images constituting a pair of stereo images are supplied to the two eyes of the viewer.

8. Display arrangement according to claim 1, wherein each image is generated by a single picture element or several parallel picture elements with mutual stationary positions which generate a complete series of images or part-images within the integration time of the eye or eyes of the viewer.

9. Display arrangement according to claim 1, wherein said second display element includes opto-mechanical or electro-mechanical means for reproducing said at least two variables.

10. Display arrangement according to claim 9, wherein the second display element is supplied with variables which are individually adapted for producing an individually adapted image for the respective viewer.

11. Display arrangement according to claim 9, wherein two part images constituting a pair of stereo images are supplied to the two eyes of the viewer.

12. Display arrangement according to claim 9, wherein each image is generated by a single picture element or several parallel picture elements with mutual stationary positions which generate a complete series of images or part-images within the integration time of the eye or eyes of the viewer.

* * * * *